(12) United States Patent
Abe et al.

(10) Patent No.: US 6,284,340 B1
(45) Date of Patent: Sep. 4, 2001

(54) CRYSTALLIZED GLASS, MAGNETIC DISC SUBSTRATE AND MAGNETIC DISC

(75) Inventors: Masahiro Abe; Takahiro Takahashi, both of Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/670,070

(22) Filed: Sep. 26, 2000

(30) Foreign Application Priority Data

Sep. 29, 1999 (JP) .................................................. 11-276083

(51) Int. Cl.$^7$ ........................................................ G11B 5/82
(52) U.S. Cl. .......................... 428/65.3; 428/141; 428/426; 428/694 ST; 428/694 SG; 428/900; 501/4; 501/5; 501/7
(58) Field of Search ................................... 428/65.3, 141, 428/426, 694 ST, 694 SG, 900; 501/4, 5, 7

(56) References Cited

U.S. PATENT DOCUMENTS 5,872,069 * 2/1999 Abe .......................................... 501/5

FOREIGN PATENT DOCUMENTS

| 2516553 | 4/1996 | (JP) . |
| 2628460 | 4/1997 | (JP) . |
| 9-208260 | 8/1997 | (JP) . |
| 2736869 | 1/1998 | (JP) . |
| 10-226532 | 8/1998 | (JP) . |
| 11-16143 | 1/1999 | (JP) . |
| 11-16151 | 1/1999 | (JP) . |

* cited by examiner

Primary Examiner—Stevan A. Resan
(74) Attorney, Agent, or Firm—Burr & Brown

(57) ABSTRACT

A crystallized glass has a main crystal phase of petalite ($Li_2O.Al_2O_3.8SiO_2$) phase and lithium disilicate ($Li_2O.2SiO_2$) phase and an auxiliary crystal phase of α-quartz phase. In the crystallized glass, a crystal phase composition measured by Rietvelt method is as follows: 20 wt %≦petalite phase≦40 wt %, 25 wt %≦lithium disilicate phase≦45 wt %, and 10 wt %≦α-quartz phase≦25 wt %.

6 Claims, 1 Drawing Sheet

CRYSTALLIZED GLASS, MAGNETIC DISC SUBSTRATE AND MAGNETIC DISC

BACKGROUND OF THE INVENTION

1. Field of the Invention

The present invention relates to a crystallized glass, a magnetic disc substrate using the crystallized glass, and a magnetic disc using the magnetic disc substrate.

2. Description of Related Art

Generally, predetermined thermal expansion coefficient, smooth surface, high strength and so on are required for a magnetic disc substrate. Particularly, in a use of the magnetic disc substrate, a glass having a thermal expansion coefficient of $60-90 \times 10^{-7}$/k level at near room temperature is required. Moreover, in order to improve a record density of a hard disc, it is necessary to decrease a suspension amount of a magnetic head, and thus a highly smooth surface is required for the substrate. Further, a magnetic film decreases its characteristics if it reacts with alkali metal ion. Therefore, it is necessary to avoid strongly an intrusion of alkali metal ion from the substrate to the magnetic film.

In Japanese Patent Laid-Open Publication No. 11-16151 (JP-A-11-16151) and Japanese Patent Laid-Open Publication No. 11-16143 (JP-A-11-16143), it was disclosed a crystallized glass for the magnetic disc in which a main crystal phase was α-quartz phase and lithium disilicate phase. In Japanese Patent Laid-Open Publication No. 10-226532 (JP-A-10-226532), it was disclosed a crystal glass for the magnetic disc in which a chemical durability was improved.

In the known crystallized glass having cristobalite phase and lithium disilicate phase as the main crystal phase, or, in the known crystallized glass having α-quartz phase and lithium disilicate phase as the main crystal phase, crystal particles are liable to be large in both cases, and thus there arises a problem such that a surface roughness after a precise polishing treatment becomes not so smooth. Particularly, in the crystallized glass having α-quartz phase and lithium disilicate phase as the main crystal phase, a thermal expansion coefficient is about $100 \times 10^{-7}$/k, and thus it is too large to be used for the magnetic disc. Moreover, in the crystallized glass having cristobalite phase and lithium disilicate phase as the main crystal phase, or, in the crystallized glass having α-quartz phase and lithium disilicate phase as the main crystal phase, an elution amount of lithium from the substrate is large, and thus an affection applying to a magnetic film is worried about.

For example, in the above JP-A-11-16151 and JP-A-11-16143, an elution of lithium is not mentioned at all. Moreover, since α-quartz phase is precipitated as a condensed state, a surface roughness (Ra) after a precise polishing treatment is 3-9 angstrom at best. In the above JP-A-10-226532, a chemical durability of glass is described in relation to a specific composition and also it is explained with reference to a glass weight variation, but an elution of lithium is not described at all.

SUMMARY OF THE INVENTION

An object of the invention is to suppress an agglomeration of α-quartz phase or a bulk generation of crystal particles, decrease a thermal expansion coefficient at a temperature range from $-50°$ C. to $+70°$ C. and prevent an elution of lithium from a crystallized glass, in a crystallized glass of $SiO_2$-$Al_2O_3$-$Li_2O$ series having lithium disilicate phase and α-quartz phase.

According to the invention, a crystallized glass, which has a main crystal phase of petalite ($Li_2O.Al_2O_3.8SiO_2$) phase and lithium disilicate ($Li_2O.2SiO_2$) phase and an auxiliary crystal phase of α-quartz phase, comprises a crystal phase composition measured by Rietvelt method of:

20 wt % ≤ petalite phase ≤ 40 wt %,
25 wt % ≤ lithium disilicate phase ≤ 45 wt %, and
10 wt % ≤ α-quartz phase ≤ 25 wt %.

During various studies about the crystal glass of $SiO_2$—$Al_2O_3$—$Li_2O$ series having lithium disilicate phase and α-quartz phase, the inventors found such a phenomenon that, when a crystallized temperature was decreased at about 10–30° C., a precipitation amount of α-quartz phase was decreased and instead a large amount of petalite was precipitated.

By precipitating the petalite phase whose amount is larger than α-quartz phase, the petalite phase and the lithium disilicate phase were precipitated as a main crystal phase, and the α-quartz phase was precipitated as an auxiliary crystal phase. In this case, it was possible to control a thermal expansion coefficient at a temperature range from $-50°$ C. to $70°$ C. to a level of $60-90 \times 10^{-7}$/k. In addition, it was found that, by precipitating the petalite phase as the main crystal phase, a surface roughness after precisely polishing the crystallized glass could be smaller. Moreover, it was found that, by increasing a crystal amount of petalite phase, an elution amount of lithium could be extraordinarily smaller. In this manner mentioned above, the present invention was achieved.

The petalite is less apt to be large particles. Therefore, if a precipitated amount of petalite phase is increased, it is supposed that a crystallized glass having fine crystal grain can be produced.

Moreover, during a step of precipitating α-quartz phase, raw materials are deformed into α-quartz via petalite. In this case, when α-quartz ($SiO_2$) phase is once precipitated, lithium component that is existent in petalite ($Li_2O.Al_2O_3.8SiO_2$) is moved into a non-crystallized remaining glass. Therefore, it is supposed that an amount of lithium in the remaining glass is increased and an elution amount of lithium is also increased. On the other hand, petalite includes lithium in its crystal. Therefore, it is also supposed that, if a precipitated amount of petalite is large, an amount of lithium existent in the petalite crystal is increased accordingly, so that an elution amount of lithium is decreased. However, the inventors find after an actual lithium elution test that, in the crystallized glass according to the invention, a lithium elution can be suppressed extraordinarily to such an extent that it is not explained by such a mechanism mentioned above.

That is to say, if the above mechanism is correct, it is supposed that an elution amount of lithium is in substantially proportion to an amount of lithium existent in the remaining glass. However, in the crystallized glass according to the invention, a decrease of lithium elution amount is remarkable beyond our prediction, and an amount of lithium existent in the remaining glass may be also decreased.

In the present invention, the lithium disilicate phase and the petalite phase are the main crystal phase and the α-quartz phase is the auxiliary crystal phase. This indicates that an amount of lithium disilicate phase and an amount of petalite phase are respectively larger than that of α-quartz phase. Differences between an amount of lithium disilicate phase or an amount of petalite phase and an amount of α-quartz phase are not particularly limited, but such a difference is preferably not lower than 5 wt %, more preferably 10 wt %.

A crystal phase composition in the crystallized glass is preferable if it is as follows:

30 wt % ≦ petalite phase ≦ 40 wt %,
25 wt % ≦ lithium disilicate phase ≦ 40 wt %, and
10 wt % ≦ α-quartz phase ≦ 20 wt %.

A crystallinity of the crystallized glass according to the invention is preferable if it is not lower than 70 wt %, more preferably 75 wt %.

A method of producing the crystallized glass according to the invention is not limited, but one example is as follows.

If an amount of $SiO_2$ in a raw glass is limited to not lower than 70 wt %, a crystal grain can be made fine. If it is limited to not more than 80 wt %, the raw glass is easily melted. More preferably, an amount of $SiO_2$ is not lower than 72 wt % but not more than 77 wt %.

If an amount of $Al_2O_3$ in the raw glass is less than 5 wt %, the α-quartz phase is not precipitated and a thermal expansion coefficient of the crystallized glass is lowered. If an amount of $Al_2O_3$ exceeds 10 wt %, a solubility of the glass is deteriorated. More preferably, an amount of $Al_2O_3$ is not lower than 6.5 wt % but not more than 8.5 wt %.

If an amount of $Li_2O$ is limited to not lower than 7 wt % more preferably 8 wt %, it is possible to precipitate a desired crystal phase. If an amount of $Li_2O$ exceeds 10 wt %, a crystal grain becomes larger.

If an amount of $P_2O_5$ is less than 1 wt %, a desired crystal is not precipitated. If an amount of $P_2O_5$ exceeds 3 wt %, the crystallized glass loses its clarity and a crystal grain becomes easily larger. More preferably, an amount of $P_2O_5$ is not more than 2 wt %.

$K_2O$ can be included in the raw glass by 0–3 wt %. $K_2O$ functions to decrease a melting temperature of the glass. In order to achieve such a function, it is preferred that an amount of $K_2O$ is limited to not lower than 1 wt %. Moreover, if an amount of $K_2O$ exceeds 3 wt %, the α-quartz phase is not precipitated, a thermal expansion coefficient is lowered and a crystal grain becomes larger. More preferably, an amount of $K_2O$ is not more than 2 wt %.

It is preferred to include 0–3 wt % of CaO and 0–3 wt % of BaO in the raw glass. Theses components function to lower a melting temperature of the raw glass. If an amount of CaO or BaO exceeds 3 wt %, the crystal phase is not precipitated. More preferably, an amount of CaO or BaO is not more than 1.5 wt %.

It is preferred to include 0–3 wt % of ZnO in the raw glass. ZnO functions to lower a melting temperature of the raw glass. If an amount of ZnO exceeds 3 wt %, the crystallized glass loses easily its clarity. More preferably, an amount of ZnO is not more than 1.5 wt %.

It is preferred to include 0–6 wt % of $ZrO_2$ in the raw glass. $ZrO_2$ functions to make crystal grains fine. If an amount of ZrO2 exceeds 6 wt %, the α-quartz phase is not precipitated. More preferably, an amount of $ZrO_2$ is not lower than 1 wt % but not more than 4 wt %.

It is preferred to include 0–2 wt % of $Sb_2O_3$ in the raw glass. An amount of $Sb_2O_3$ is saturated in the raw glass by 2 wt % at best. More preferably, an amount of $Sb_2O_3$ is not lower than 0.1 wt % but not more than 1 wt %.

It is preferred to include 0–6 wt % of $Nb_2O_5$ in the raw glass. If Nb2O5 is added, a variation of thermal expansion coefficient becomes small if a crystallized temperature is varied. If an amount of $Nb_2O_5$ exceeds 6 wt %, a crystal grain becomes larger. More preferably, an amount of Nb2O5 is not more than 2 wt %.

Moreover, the other components may be included in the crystallized glass according to the invention. At first, $TiO_2$, $SnO_2$, a fluoride of noble metals such as platinum may be included separately or in a mixed state of two or more components.

Moreover, 0–2 wt % of $As_2O_3$ may be included in the raw glass. $As_2O_3$ functions to be a cleaner when the glass is melted. In addition, 0–3 wt % of $B_2O_3$ may be included in the raw glass.

When the raw glass is produced, raw materials including respective metal elements mentioned above are mixed at a weight rate mentioned above to obtain a mixture, and the thus obtained mixture is melted. As the raw materials, use is made of oxide, carbonate, nitrate, phosphate, hydroxide of respective metal elements. Moreover, as an atmosphere when the raw glass is subjected to a heat treatment to be crystallized, use is made of air atmosphere, reduction atmosphere, vapor atmosphere, pressurized atmosphere and so on.

When the raw glass is heated in the method of producing the crystallized glass, it is preferred to generate a crystal nucleus by controlling a temperature ascending rate in a temperature range of at least not lower than 500° C. to 50–300° C./hour. Moreover, it is preferred to generate a crystal nucleus by maintaining the raw glass for 2–5 hours in a temperature range of 590–650° C. It is preferred that a crystallized temperature is 700–760° C. Even in the temperature range mentioned above, a temperature at which a large amount of petalite phase is precipitated is varied corresponding to a composition of the raw glass. In this case, the petalite phase is transferred to the α-quartz phase, and thus there is a tendency such that a large amount of α-quartz phase is precipitated. Therefore, at a specific composition, when an amount of α-quartz phase is increased by decreasing a crystallized temperature.

In a step of precisely polishing a member made of the crystallized glass mentioned above by means of abrasive particles, use is made of the known precise polishing method such as so-called lapping, polishing and so on, so as to form a magnetic disc substrate. Moreover, on a principle surface of the magnetic disc substrate, base treatment layer, magnetic film, overcoating layer can be formed, and further a lubricant may be applied on the overcoating layer to form a magnetic disc.

DESCRIPTION OF THE PREFERRED EMBODIMENT

Figure 1:
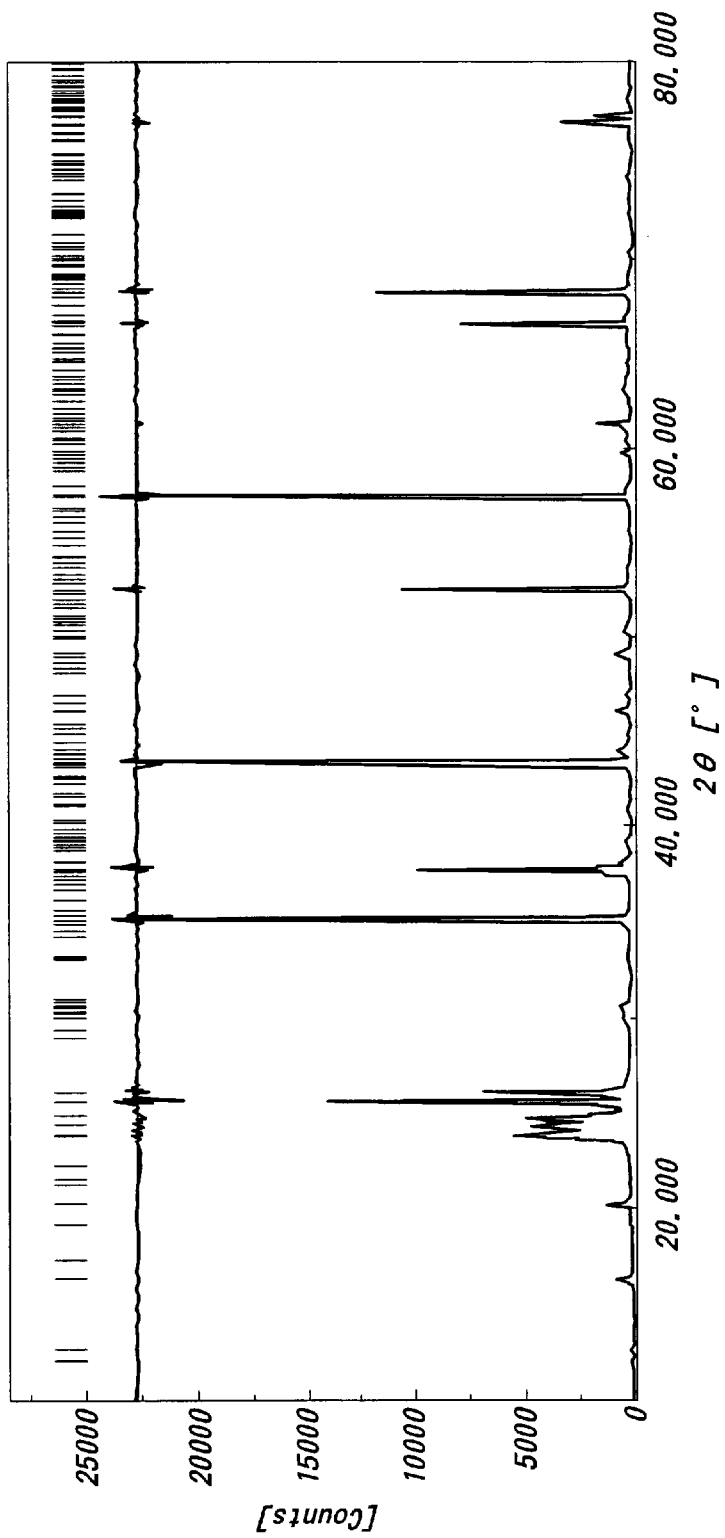
FIG. 1 is a graph showing a result of Rietvelt analysis of a crystallized glass in the example 1.

Hereinafter, actual experiments will be explained.
(Production of Parent Glass)

Raw materials including respective metal elements were mixed to obtain mixtures of examples 1–5 and comparative examples 1–4 having respective chemical compositions shown in Table 1 and Table 3. Then, 250 g of the thus obtained respective mixtures was set in a platinum crucible having a volume of 200 cc to perform a heat treatment at 1400° C. for 5.5 hours, so that the mixture was melted. Then, a temperature of the crucible was descended to 1350° C., and was maintained for 1 hour at that temperature. After that, a raw glass in the crucible was flowed out into a die made of carbon to form the raw glass. Then, the formed raw glass was subjected to a one hour anneal treatment, and the annealed raw glass was cooled slowly to obtain a disc parent glass.

Then, two kinds of planar samples having dimensions of 15×15×0.85 (thickness) mm and 5×30×0.85 (thickness) mm respectively, and a ring disc samples each having a dimension of outer diameter: 65.00 mm, inner diameter: 20.25 mm and thickness: 0.85 mm were cut our from the thus obtained parent glass. Moreover, both surfaces of respective samples were polished by using #400 whetstone.

(Crystallized Step)

Respective planar samples were crystallized in a nitrogen atmosphere under such a state that the planar sample was sandwiched by carbon plates having a thickness of 5 mm. A crystallizing schedule was as follows: heating to the nucleus formation temperature shown in Table 1 and Table 3 by a temperature ascending rate of 200° C./hour; maintaining at the nucleus formation temperature for 2–5 hours; heating to the crystallized temperature shown in Table 1 and Table 3 by a temperature ascending rate of 100° C./hour; maintaining at the crystallized temperature for 2–5 hours; and cooling to a room temperature by a temperature descending rate of 200° C./hour.

(Identification of Crystal Phase)

An X-ray diffraction apparatus (RINT2500) having an X-ray output of 50 kV·300 mV was used under the condition of $2\theta=10–60°$, step width: 0.02°, Fixed Time: 10 seconds, slit: DS=SS=0.5°, RS=0.15°. An optical system having Ge(111) flexure-type monochromator was provided at a light incident side of the X-ray diffraction apparatus. Crystallinities of respective crystal phases in the crystallized glass were measured by Rietvelt analyzing method using a standard sample of alumina (analyzing program: "RIETAN"). Quantitative analysis of crystal phases by using "RIETAN" was described in "J.Appl.Crystallogr.", 20,411 (1987), F.Izumi et al.

The results of this identification were shown in Table 2 and Table 4. From the results shown in Table 2 and Table 4, it was understood that crystal phases such as petalite ($Li_2O.Al_2O_3.8SiO_2$), lithium disilicate ($Li_2O.2SiO_2$: referred to "L2S"), α-quartz (chemical formula: $SiO_2$), spodumene ($Li_2Al_2Si_8O_{20}$), crystobalite (chemical formula: $SiO_2$) were observed.

(Measurement of Thermal Expansion Coefficient α)

The planar samples having a dimension of 5×30×0.85 (thickness) mm, in which the crystallization was finished, were cut out to form measurement samples each having a length of 20 mm. Then, thermal expansion coefficients of the thus formed measurement samples were measured in a temperature range from −50° to +70° by using an apparatus for measuring thermal expansion coefficient ("TD5000S":MAC Science Co., Ltd.) It should be noted that the thermal expansion coefficient responded sensitive to a slight variation of the crystallized temperature. Therefore, the values α shown in Table 2 and Table 4 indicated average values α obtained from three measurement samples that were crystallized at temperatures of (respective crystallized temperature shown in Table 1 and Table 3)±10° C.

(Measurement of Ra on Smooth Surface After Precise Polishing)

The planar samples having a dimension of 15×15×0.85 (thickness) mm, to which the crystal phase identification was finished, were precisely polished by using #700 whetstone to a level such that a thickness of the planar sample became 0.645 mm. Further, a polishing treatment was performed to the respective planar samples by using double-ended polishing machine and cerium oxide particles having a particle size of 1.0 μm to a level such that a thickness of the planar sample became 0.635 mm. Furthermore, a second polishing treatment was performed to the respective planar samples by using cerium oxide particles having a particle size of 0.02 μm to obtain precisely polished members having a thickness of 0.635 mm. Then, a center line average surface roughness (Ra) of the respective precisely polished members was measured by using a tapping mode of atomic force microscope (M5 manufactured by PSI) in which use was made of a cantilever made of silicone (resonance frequency: 300 kHz). The results were shown in Table 2 and Table 4.

(Microstructure Observation)

The precisely polished members were etched for 3 minutes in 5% hydrofluoric acid solution. After that, particle sized of the crystal phase were observed by a scanning electron microscope. The results were shown in Table 2 and Table 4.

(Measurement of Li Elution Amount)

Ring disc measurement samples (precisely polished members) having a dimension of outer diameter: 65.00 mm, inner diameter: 20.25 mm and thickness: 0.635 mm were obtained in the same manner as mentioned above from the ring disc samples. The thus obtained ring disc measurement sample and 50 ml of purified water were set in a closed vessel made of silicon having a volume of 300 ml. Moreover, a silicon bar was provided under the measurement sample. Then, the closed vessel was set in a clean oven. In the clean oven, the closed vessel was maintained for 22 hours at 80° C. so as to elute Li in the purified water. After that, Li amount in the purified water was measured by an atomic absorption spectrophotometer. The results were shown in Table 2 and Table 4.

TABLE 1

| Composition | Example 1 | Example 2 | Example 3 | Example 4 | Example 5 |
|---|---|---|---|---|---|
| $SiO_2$ | 74.44 | 70.51 | 74.98 | 76.08 | 71.82 |
| $Al_2O_3$ | 7.04 | 9.76 | 6.53 | 7.06 | 8.20 |
| $Li_2O$ | 9.49 | 9.74 | 8.67 | 9.92 | 9.92 |
| $P_2O_5$ | 1.90 | 1.94 | 1.72 | 1.90 | 1.95 |
| $K_2O$ | 2.05 | 2.04 | 2.74 | 2.84 | 2.06 |
| CaO | 0.44 | 0.51 | 0.45 | — | 0.51 |
| BaO | 0.60 | 0.71 | 0.63 | — | 0.72 |
| ZnO | 0.43 | 0.51 | 0.45 | — | 0.51 |
| $Sb_2O_3$ | 0.20 | 0.20 | 0.20 | 0.20 | 0.20 |
| $ZrO_2$ | 2.56 | 3.06 | 2.72 | 2.00 | 3.08 |
| $Nb_2O_5$ | 0.85 | 1.02 | 0.91 | — | 1.03 |
| Nucleus formation temperature (° C.) | 590 | 590 | 650 | 550 | 590 |
| Crystallized temperature (° C.) | 710 | 700 | 720 | 760 | 710 |

TABLE 2

| | Example 1 | Example 2 | Example 3 | Example 4 | Example 5 |
|---|---|---|---|---|---|
| Main crystal phase | petalite L2S α-quarts | petalite L2S α-quarts | petalite L2S α-quarts | petalite L2S α-quarts | petalite L2S α-quarts |
| Petalite phase (%) | 33 | 24 | 21 | 36 | 29 |
| L2S phase (%) | 27 | 31 | 32 | 38 | 34 |
| α-quarts phase (%) | 17 | 20 | 23 | 11 | 12 |
| $\alpha(\times 10^{-7} \cdot K^{-1})$ | 80 | 71 | 86 | 65 | 76 |
| Particle size (μm) | 0.15 | 0.15 | 0.22 | 0.23 | 0.18 |
| Ra (angstrom) | 4 | 4 | 5 | 5 | 4 |
| Li elution amount (μg) | 18 | 21 | 24 | 16 | 19 |

(L2S) indicates lithium disilicate

TABLE 3

| Composition | Comparative Example 1 | Comparative Example 2 | Comparative Example 3 | Comparative Example 4 |
|---|---|---|---|---|
| $SiO_2$ | 74.44 | 78.08 | 81.30 | 73.20 |
| $Al_2O_3$ | 7.04 | 4.11 | 5.50 | 6.20 |
| $Li_2O$ | 9.49 | 10.37 | 6.10 | 9.30 |
| $P_2O_5$ | 1.90 | 1.90 | 1.20 | 1.60 |
| $K_2O$ | 2.05 | 2.84 | 1.00 | — |
| CaO | 0.44 | — | 0.50 | 2.00 |
| BaO | 0.60 | — | — | 1.50 |
| ZnO | 0.43 | 0.50 | 0.20 | 2.00 |
| $Sb_2O_3$ | 0.20 | 0.20 | 0.20 | 0.20 |
| $ZrO_2$ | 2.56 | 2.00 | 4.00 | 2.00 |
| $Nb_2O_5$ | 0.85 | — | — | 2.00 |
| Nucleus formation temperature (° C.) | 590 | 540 | 570 | 630 |
| Crystallized temperature (° C.) | 740 | 730 | 760 | 730 |

TABLE 4

| | Comparative Example 1 | Comparative Example 2 | Comparative Example 3 | Comparative Example 4 |
|---|---|---|---|---|
| Main crystal phase | α-quartz L2S petalite | petalite L2S cristobalite | L2S cristobalite petalite | α-quarts L2S spodumene petalite |
| Petalite phase (%) | 9 | 23 | 19 | 12 |
| L2S phase (%) | 36 | 32 | 35 | 31 |
| α-quarts phase (%) | 27 | — | — | 23 |
| $\alpha(\times 10^{-7} \cdot K^{-1})$ | 101 | 75 | 84 | 95 |
| Particle size (μm) | 0.15 | 0.25 | 0.50 | 0.32 |
| Ra (angstrom) | 5 | 7 | 10 | 8 |
| Li elution amount (μg) | 35 | 30 | 27 | 28 |

(L2S) indicates lithium disilicate

In the examples 1–5, the crystal phases of the crystallized glass were petalite, lithium disilicate and α-quartz. Moreover, the thermal expansion coefficient was not more than 0.3 μm, and the surface roughness was not more than 5 μm. Furthermore, the elution amount of lithium was not more than 25 μg.

The chemical composition of the example 1 was same as that of the comparative example 1, but the crystallized temperature of the comparative example 1 was higher than that of the example 1. Therefore, in the comparative example 1, petalite was decreased, and thus the petalite phase was the auxiliary crystal phase. In the example 1, the petalite phase became the main crystal phase by decreasing the crystallized temperature lower than that of the comparative example 1. In the comparative example 1, the elution amount of lithium was 35 μg. This value was about two times larger than that of the example 1.

From the comparative examples 1, 3 and 4, it was understood that the elution amount of lithium became not lower than 25 μg if the petalite phase was not precipitated by not lower than 20 wt %.

From the example 2 and the comparative example 3, if an amount of $SiO_2$ exceeded 80 wt %, the desired crystal phases particularly α-quartz were not precipitated, and Ra reached to a level of 10 angstrom. Moreover, the elution amount of lithium exceeded 25 μg. Therefore, in this invention, it was preferred to limit an amount of $Si_2$ to 70–80 wt %.

From the example 2 and the comparative example 2, if an amount of $Al_2O_3$ was less than 5 wt %, the desired crystal phases particularly α-quartz were not obtained, and the Ra reached to a level of 7 angstrom. Moreover, the elution amount of lithium exceeded 30 μg. Therefore, in this invention, it was preferred to limit an amount of $Al_2O_3$ to 5–10 wt %.

From the examples 4, 5 and the comparative example 3, if an amount of $LiO_2$ was less than 7 wt %, the desired crystal phases were not obtained, and the Ra reached to a level of 10 angstrom. Therefore, in this invention, it was preferred to limit an amount of $Li_2O$ to 7–10 wt %.

FIG. 1 is a graph showing a result of Rietvelt analysis of the crystal glass in the example 1. In FIG. 1, three peaks were detected in a range from 23.9° to 24.8°. Among these three peaks, the leftmost peak (near 23.9°) was a main peak of petalite. This petalite main peak was relatively large. Moreover, α-quartz peak near 26° was not so large. From the analysis results, the crystal phase of the example 1 was identified as petalite: 33 wt %, lithium disilicate: 27 wt %, α-quartz: 17 wt %. The crystal phases of the other examples and comparative examples were also identified in the same manner as that of the example 1 mentioned above.

As mentioned above, according to the invention, in the crystallized glass of $SiO_2$—$Al_2O_3$—$Li_2O$ serries having lithium disilicate phase and α-quartz phase, an agglomeration of α-quartz and a bulk generation of crystal particles are suppressed, and a thermal expansion coefficient in a temperature range from −50° C. to +70° C. becomes lower, so that an lithium elution from the glass can be prevented.

What is claimed is:

1. A crystallized glass, which has a main crystal phase of petalite ($Li_2O.Al_2O_3.8SiO_2$) phase and lithium disilicate ($Li_2O.2SiO_2$) phase and an auxiliary crystal phase of α-quartz phase, comprising a crystal phase composition measured by Rietvelt method of:
   20 wt % ≦ petalite phase ≦ 40 wt %,
   25 wt % ≦ lithium disilicate phase ≦ 45 wt %, and
   10 wt % ≦ α-quartz phase ≦ 25 wt %.

2. The crystallized glass according to claim 1, which has an oxide composition of:
   70 wt % ≦ $SiO_2$ ≦ 80 wt %,
   5 wt % ≦ $Al_2O_3$ ≦ 10 wt %,
   7 wt % ≦ $Li_2O$ ≦ 10 wt %,
   1 wt % ≦ $P_2O_5$ ≦ 3 wt %,
   0 wt % ≦ $K_2O$ ≦ 3 wt %,
   0 wt % ≦ CaO ≦ 3 wt %,
   0 wt % ≦ BaO ≦ 3 wt %,
   0 wt % ≦ ZnO ≦ 3 wt %,
   0 wt % ≦ $ZrO_2$ ≦ 6 wt %,
   0 wt % ≦ $Sb_2O_3$ ≦ 2 wt %, and
   0 wt % ≦ $Nb_2O_5$ ≦ 6 wt %.

3. The crystallized glass according to claim 1, wherein a thermal expansion coefficient at a temperature range from −50° C. to +70° C. is 60–90×$10^{-7}$/k, and a center line average surface roughness (Ra) after a precise polishing treatment is not more than 5 angstrom.

4. The crystallized glass according to claim 1, wherein an elution amount of lithium is not more than 25 μg when a ring disc sample after a precise polishing treatment having a dimension of outer diameter: 65.00 mm, inner diameter: 20.25 mm and thickness: 0.635 mm is immersed into a purified water of 50 ml for 22 hours at a temperature of 80° C.

5. A magnetic disc substrate, comprising the crystallized glass according to claim 1.

6. A magnetic disc, comprising the magnetic disc substrate according to claim 5, a base film formed on a smooth surface of said magnetic disc substrate, and a metal magnetic layer formed on said base film.

* * * * *